United States Patent
Bates et al.

(10) Patent No.: US 6,184,883 B1
(45) Date of Patent: Feb. 6, 2001

(54) COMPUTER SYSTEM, PROGRAM PRODUCT AND METHOD UTILIZING IN-FOCUS SWITCH DELAY FOR USER INTERFACE COMPONENTS

(75) Inventors: Cary Lee Bates; Paul Reuben Day, both of Rochester, MN (US)

(73) Assignee: International Business Machines Corporation, Armonk, NY (US)

(*) Notice: Under 35 U.S.C. 154(b), the term of this patent shall be extended for 0 days.

(21) Appl. No.: 09/040,637

(22) Filed: Mar. 18, 1998

(51) Int. Cl.[7] .................................................. G06F 13/00
(52) U.S. Cl. ........................................ 345/345; 345/145
(58) Field of Search .................................. 345/113, 114, 345/115, 340, 341, 342, 343, 344, 345, 145, 157, 160, 161, 162, 163

(56) References Cited

U.S. PATENT DOCUMENTS

| | | | | |
|---|---|---|---|---|
| 5,333,255 | * | 7/1994 | Damouth | 345/157 |
| 5,377,317 | * | 12/1994 | Bates et al. | 345/157 |
| 5,412,775 | * | 5/1995 | Maeda et al. | 345/158 |
| 5,469,540 | * | 11/1995 | Powers, III et al. | 345/158 |
| 5,590,265 | * | 12/1996 | Nakazawa | 345/340 |
| 5,600,346 | * | 2/1997 | Kamata et al. | 345/120 |
| 5,689,667 | * | 11/1997 | Kurtenbach | 345/352 |
| 5,717,877 | * | 2/1998 | Orton et al. | 345/326 |
| 5,721,853 | * | 2/1998 | Smith | 345/353 |
| 5,754,176 | * | 5/1998 | Crawford | 345/338 |
| 5,805,163 | * | 9/1998 | Bagnas | 345/345 |
| 5,812,132 | * | 9/1998 | Goldstein | 345/345 |
| 5,819,189 | * | 10/1998 | Kramer et al. | 701/22 |
| 5,841,440 | * | 11/1998 | Guha | 345/419 |
| 5,859,637 | * | 11/1998 | Tidwell | 345/336 |
| 5,872,558 | * | 2/1999 | Hidaka | 345/145 |
| 5,892,511 | * | 4/1999 | Gelsinger et al. | 345/340 |
| 5,900,873 | * | 5/1999 | Isoda et al. | 345/344 |
| 5,937,417 | * | 8/1999 | Nielsen | 707/513 |
| 5,953,009 | * | 9/1999 | Alexander | 345/348 |
| 5,969,708 | * | 10/1999 | Walls | 345/145 |

* cited by examiner

Primary Examiner—Ba Huynh
(74) Attorney, Agent, or Firm—Wood, Herron & Evans, L.L.P.

(57) ABSTRACT

A computer system, program product and method implement a time delay in an in-focus switch operation to minimize inadvertent switching between user interface components such as windows and the like. More specifically, in response to user input to move a pointer from the display region of a first user interface component to the display region of a second user interface component, the second user interface component is promoted to a higher layer than the first user interface component so long as no user input to move the pointer back to the display region of the first user interface component is received within a predetermined period of time. As a result, when a user inadvertently moves the pointer from the display region of the first user interface component to that of the second user interface component, the in-focus switch operation is delayed to permit the user to cancel the in-focus switch operation if so desired by moving the pointer back within the display region of the first user interface component prior to expiration of the predetermined time period.

3 Claims, 5 Drawing Sheets

COMPUTER SYSTEM, PROGRAM PRODUCT AND METHOD UTILIZING IN-FOCUS SWITCH DELAY FOR USER INTERFACE COMPONENTS

FIELD OF THE INVENTION

The invention is generally related to computers and computer software. More specifically, the invention is generally related to a manner of interfacing with user interface components displayed on a computer display.

BACKGROUND OF THE INVENTION

Many computer systems utilize graphical user interfaces (GUIs) to permit user interaction with data stored in such systems. In a GUI environment, users are typically able to interact with a computer system through intuitive operations such as "pointing and clicking" on graphical user interface components displayed on a computer display with a graphical pointer controlled by a mouse or other user interface device.

Data is often presented to a user in a GUI environment using a graphical user interface component known as a window. A computer application may use one or more windows, and moreover, multiple computer applications may operate at the same time in a computer system, resulting in multiple windows being displayed at once on a computer display.

Due to limited space on a computer display, windows are typically arranged in layers, giving the visual impression that a window displayed in a relatively higher layer overlaps a window displayed in a relatively lower layer. The window displayed at the top layer is also often referred to as being in the "foreground", while windows that are displayed in layers other than the top layer are referred to being in the "background".

A window assigned to the foreground is also often referred to as being in "focus", as the computer application associated with the window typically interacts with a user by processing the non-pointer input received from a user (e.g., from a keyboard). When a user wishes to interact with a window other than the current "in-focus" window, the user must bring that window into focus, typically by "pointing and clicking" on that window while the pointer is located over the window. In response to such an operation, the clicked-on window is assigned to the top layer to become the new "in-focus" window, while the previous in-focus window is assigned to a relatively lower layer. Put another way, the clicked-on window is often said to be "promoted" to the foreground, with the previous in-focus window "demoted" to the background.

In many computer systems, an automatic in-focus window switch feature is provided to permit windows to be automatically brought into focus immediately whenever the pointer is moved over such windows by a user. Thus, whenever a pointer moves from the display region for the current in-focus window to the display region of another window, that other window is promoted to the foreground to become the new in-focus window.

Automatic in-focus window switching often improves user productivity when working with multiple windows since a user need not perform the separate action of depressing a button to bring a window into focus. However, eliminating the need to depress a button increases the risk that a user will inadvertently switch to another window. As one example, many windows are implemented with controls such as buttons, resizing handles, and/or scroll bars that are located along the outer boundaries of the windows. Performing operations with such controls requires that the pointer be moved by a user close to the boundary of the display region of a window. Should the user accidently move the pointer beyond the boundary of an in-focus window and over the display region of another window when attempting to operate a control, the other window is automatically selected, resulting in the original in-focus window being demoted to the background.

In many circumstances, inadvertent switching to another window can significantly impact user productivity. A noticeable amount of processing by a computer system is often required to promote a particular window to the foreground, often resulting in a delay of as much as one or more seconds before the operation is complete. As a result, inadvertently switching to another window and then attempting to switch back to the original in-focus window may lead to a substantial user delay.

In addition, inadvertently switching to another window may result in the original in-focus window being completely occluded by the new in-focus window—with all traces of the original window completely removed from the display. As a result, even more productivity is lost since a user often must perform more user-intensive operations to bring the original window back into focus—e.g., closing, moving, resizing or minimizing the new in-focus window, toggling between tasks, etc.

Consequently, while in-focus window switching can provide productivity gains when interacting with windows in a graphical user interface environment, the adverse impact of inadvertent switching between user interface components such as windows can often negate these potential gains for many users. Therefore, a significant need exists for a manner of improving in-focus switching operations to minimize inadvertent switching.

SUMMARY OF THE INVENTION

The invention addresses these and other problems associated with the prior art by providing a computer system, program product and method in which a time delay is implemented in an in-focus switch operation to minimize inadvertent switching between user interface components such as windows and the like. More specifically, in response to user input to move a pointer from the display region of a first user interface component to the display region of a second user interface component, the second user interface component is promoted to a higher layer than the first user interface component so long as no user input to move the pointer back to the display region of the first user interface component is received within a predetermined period of time. As a result, when a user inadvertently moves the pointer from the display region of the first user interface component to that of the second user interface component, the in-focus switch operation is delayed to permit the user to cancel the in-focus switch operation if so desired by moving the pointer back within the display region of the first user interface component prior to expiration of the predetermined time period.

By delaying the in-focus switch operation at least in certain circumstances, a user may be able to avoid the delay and lost productivity associated with an inadvertent in-focus switch, and thus may dedicate more time to productive tasks. In addition, given that many users may become frustrated due to inadvertent in-focus switching, interaction with a computer system in the manner described herein may be more enjoyable for many users.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described various embodiments of the invention.

DETAILED DESCRIPTION

The embodiments described hereinafter implement a time delay in an in-focus switch operation to minimize inadvertent in-focus switching of user interface components. As discussed above, an in-focus switch operation is optionally available in many environments to permit a user-actuated pointer to automatically bring selected windows into focus whenever the pointer is moved to a location over such windows. However, while the embodiments described hereinafter principally relate to switching focus between windows, it should be appreciated that the principles of the invention may also be utilized to switch between other types of user interface components known in the art, e.g., icons, buttons, etc.

Figure 1:
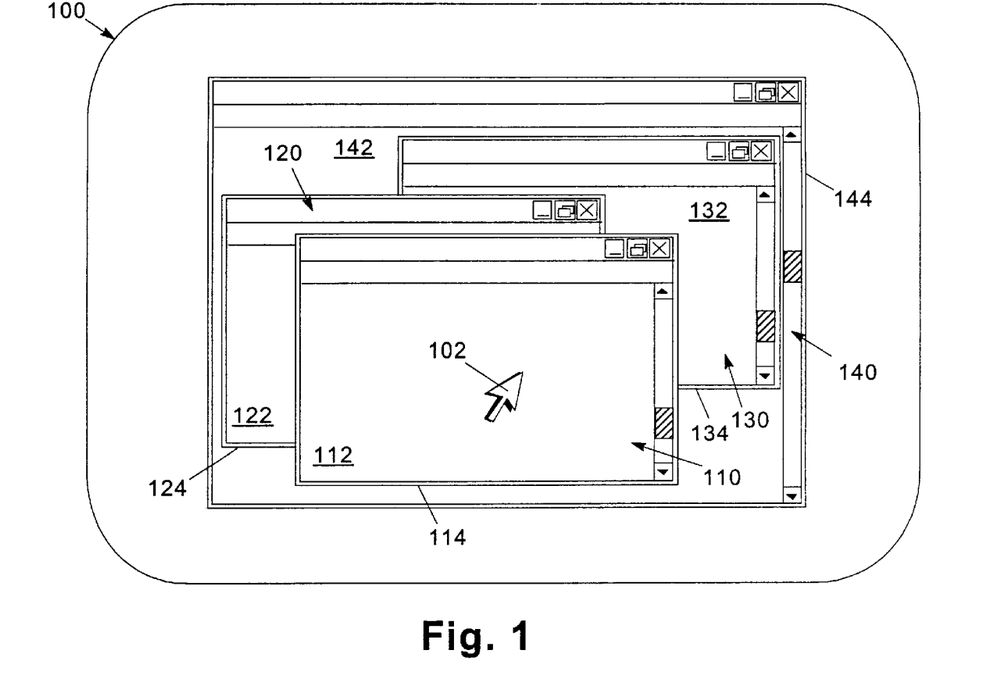
FIG. 1 is a block diagram illustrating an exemplary arrangement of windows displayed on a computer display in an overlapping arrangement.

Turning to the drawings, wherein like numbers denote like parts throughout the several views, FIG. 1 illustrates a computer display 100 within which is displayed an exemplary arrangement of windows 110, 120, 130 and 140. Each window 110, 120, 130 and 140 includes a corresponding display region 112, 122, 132 and 142 defined by a display boundary 114, 124, 134 and 144 therefor. The display boundaries are utilized by an operating system or application executing thereon to determine when a pointer (e.g., pointer 102) is disposed within the display region of a window, and thus, when focus should be granted to such a window.

Each window 110, 120, 130 and 140 is oriented in one of a plurality of display layers, with a top layer assigned to the current in-focus window, also referred to herein as the "foreground". A foreground window typically receives and processes non-pointer input received from a user, e.g., input provided through a keyboard.

Pointer 102 is shown disposed within display region 112 of window 110, and thus, window 110 is assigned to the top layer. The other windows 120, 130 and 140 are oriented in the background and are each assigned to progressively lower layers in the display.

Figure 2:
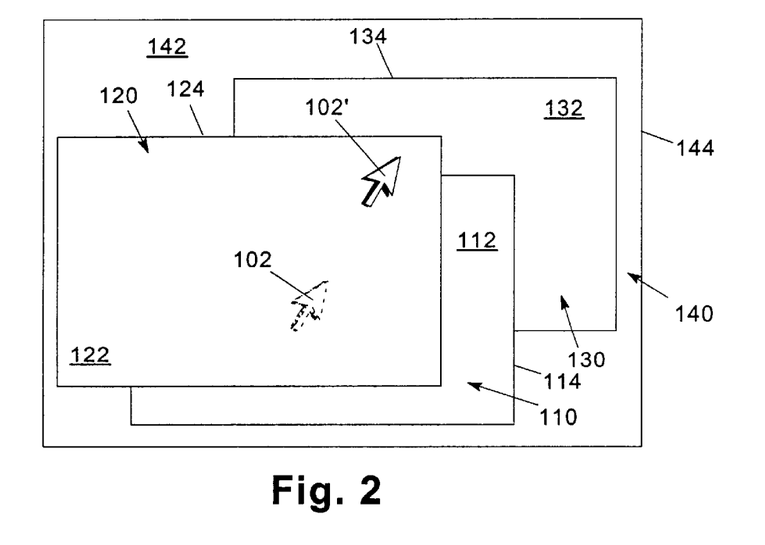
FIG. 2 is a block diagram illustrating the result of an in-focus switch operation on the exemplary arrangement of windows of FIG. 1, where a previously in-focus window is partially occluded by a new in-focus window.

As discussed above, in-focus window switching is supported in a number of conventional operating systems. FIG. 2, for example, illustrates an in-focus window switch resulting from movement of pointer 102 from a position within display region 112 of window 110 to a position within display region 122 of window 120, illustrated at 102'. As a result of this movement, window 120 is promoted to the foreground, and window 110 is demoted to a lower layer so that window 120 is displayed as partially overlapping window 110.

Consistent with the invention, a delay is implemented in association with an in-focus window switch operation to enable a user to cancel such an operation if the user moves the pointer back into the display region of a current in-focus window within a predetermined period of time, also referred to herein as the switch delay. Calculation of the switch delay may be implemented in a number of manners consistent with the invention.

A fixed period of time may simply be used to delay an in-focus window switch. In the alternative, the switch delay may vary depending upon environmental and/or operations considerations. For example, the switch delay may be dependent upon the distance that the pointer has been moved outside of the display region of the current in-focus window.

Figure 3:
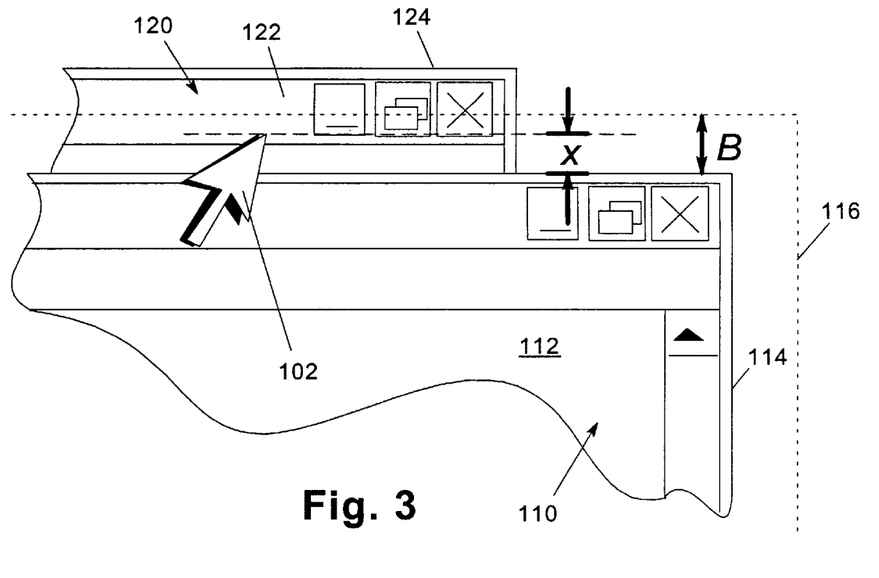
FIG. 3 is a partial enlarged fragmentary view of the exemplary arrangement of windows of FIG. 1, illustrating a switch boundary consistent with the invention.

As shown in FIG. 3, a switch boundary 116 may be defined around window 110 and separated from display boundary 114 by a distance B. The switch delay may then be set based upon a function of the distance x that pointer 102 extends beyond boundary 114, e.g. as shown in equation (1) below:

$$\text{Switch delay} = M \times (1 - x/B) \quad (1)$$

where M is a maximum switch delay constant. As a result, the farther away that the pointer is from display boundary 114, the shorter the delay. Moreover, when the pointer crosses switch boundary 116, the in-focus window switch is immediately undertaken. Any number of alternate distributions to a linear distribution may also be used to calculate a switch delay based upon the distance of the pointer. Moreover, rather than a constant, fixed boundary around a window, different shapes of boundaries may be used, and boundaries may be skewed or stretched in one or more directions to give different switch delays in different areas of a window. In addition, it may be desirable to define "zones" around a display boundary of a window, where a first switch delay value is used in the first zone (e.g., within 0.25 inch of the display boundary), a second switch delay value is used in the second zone (e.g., between 0.25 and 0.50 inch), etc.

Regardless of the particular implementation, it is typically desirable to set the switch delay to adequately balance the responsiveness of an in-focus window switch operation within an acceptable frequency of inadvertent window switch operations. It should be appreciated that the switch delay may be determined empirically, may be selected or configured by a user (e.g., through a user-configurable option or setting), or may be dynamically and/or heuristically determined by the computer system based upon past operation, among other variations.

Figure 4:
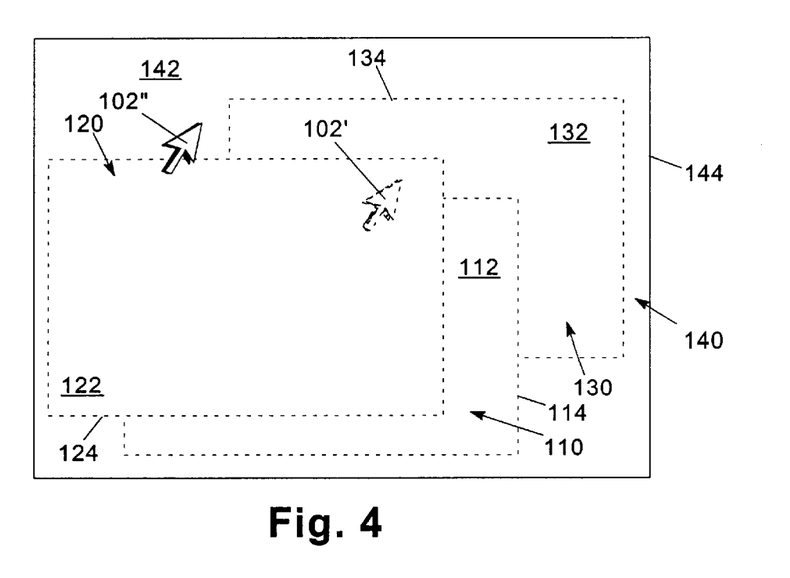
FIG. 4 is a block diagram illustrating the result of an in-focus switch operation on the exemplary arrangement of windows of FIG. 1, where a previously in-focus window is completely occluded by a new in-focus window.

Moreover, it may be desirable to specially handle a situation where switching focus between windows results in the originally in-focus window being completely occluded by the new window. For example, as shown in FIG. 4, movement of a pointer from a location in display region 122 of window 120 (illustrated at 102') to a location in display region 142 of window 140 (illustrated at 102"), may result in window 120 being completely hidden behind window 140 (as indicated by the dashed outline thereof), whereby if the in-focus window switch was inadvertent, it would be laborious to regain focus for window 120. In such instances, it may be desirable to set a relatively longer delay so that a user is granted additional time to cancel the in-focus window switch.

A specific implementation of an in-focus window switch operation consistent with the invention is described in greater detail below in connection with FIGS. 5–9. It will be appreciated, however, that various modifications may be made to the specific embodiment described below without departing from the spirit and scope of the invention.

Hardware Environment

Figure 5:
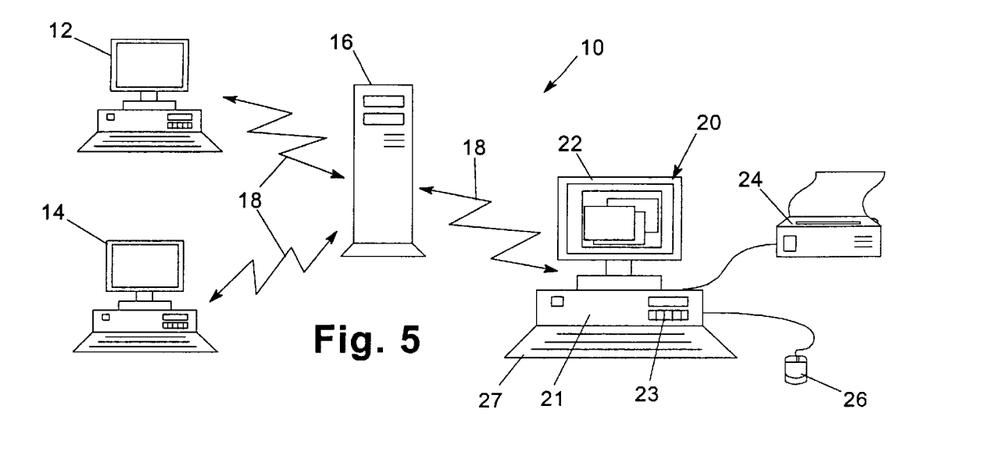
FIG. 5 is a block diagram of a computer system consistent with the invention.

A computer system 10 consistent with the invention is illustrated in FIG. 5. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include one or more processors such as a microprocessor 21; a number of peripheral components such as a computer display 22 (e.g., a CRT, an LCD display or other display device); storage devices 23 such as hard, floppy, and/or CD-ROM disk drives; a printer 24; and various user input devices (e.g., a mouse 26 and keyboard 27), among others. Computer system 20 operates under the control of an operating system and executes various computer software applications, programs, objects, modules, etc. as is well known in the art. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs" or "programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 5 is not intended to limit the present invention. Indeed, those skilled in the art will recognize that other alternative hardware environments may be used without departing from the scope of the present invention.

Software Environment

Figure 6:
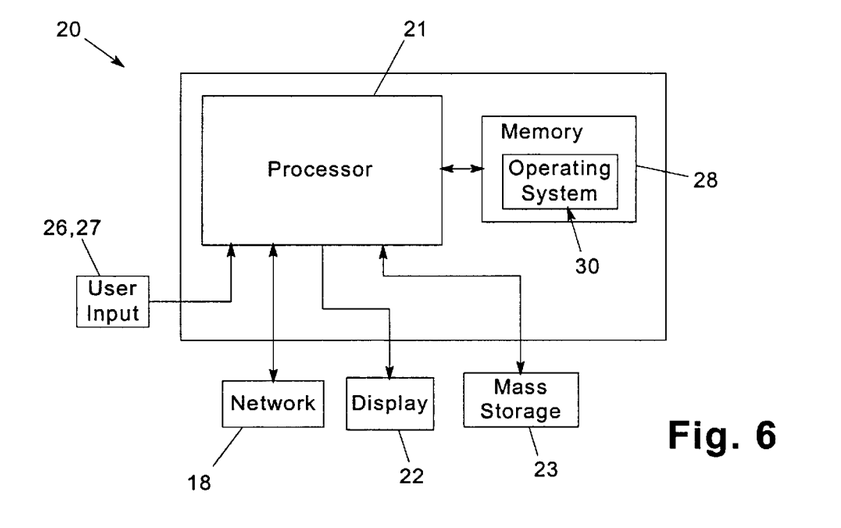
FIG. 6 is a block diagram of an exemplary software environment for the computer system of FIG. 5.

FIG. 6 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

An exemplary embodiment of the invention is implemented within the event manager of an operating system 30, illustrated in FIG. 6 as being resident in memory 28. It should be appreciated, however, that the invention may also be implemented in other software environments, e.g., within specific applications that utilize user interface components, consistent with the invention. It should also be appreciated that various components of the application may be stored on network 18 or mass storage 23 prior to start-up, and in addition, that various components may be resident at different times in any of memory 28, mass storage 23, network 18, or within registers and/or caches in processor 21.

In-Focus Switch Operation with Time Delay

Figure 7:
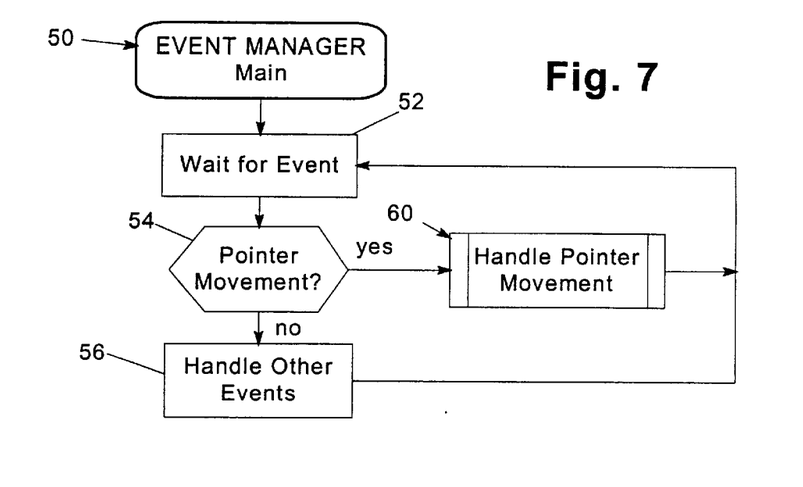
FIG. 7 is a flowchart illustrating the program flow for the main routine of an event manager in the operating system of FIG. 6.

FIG. 7 illustrates an exemplary program flow for a main routine 50 executed by the event manager portion of operating system 30 of FIG. 6. Routine 50 is shown implemented in an event-driven representation. However, other programming models, e.g., procedural, may be used in the alternative.

Routine 50 generally operates in an endless loop that waits for events at block 52, checks for certain specified events, processes those events, and returns to block 52 to wait for additional events.

One event relevant to an in-focus switch operation consistent with the invention is a pointer movement event, which is detected at block 54 and handled by a handle pointer movement routine 60. Additional events conventionally processed by an event manager, but which are not relevant to an understanding of the invention, are handled in a conventional manner in block 56.

Figure 8:
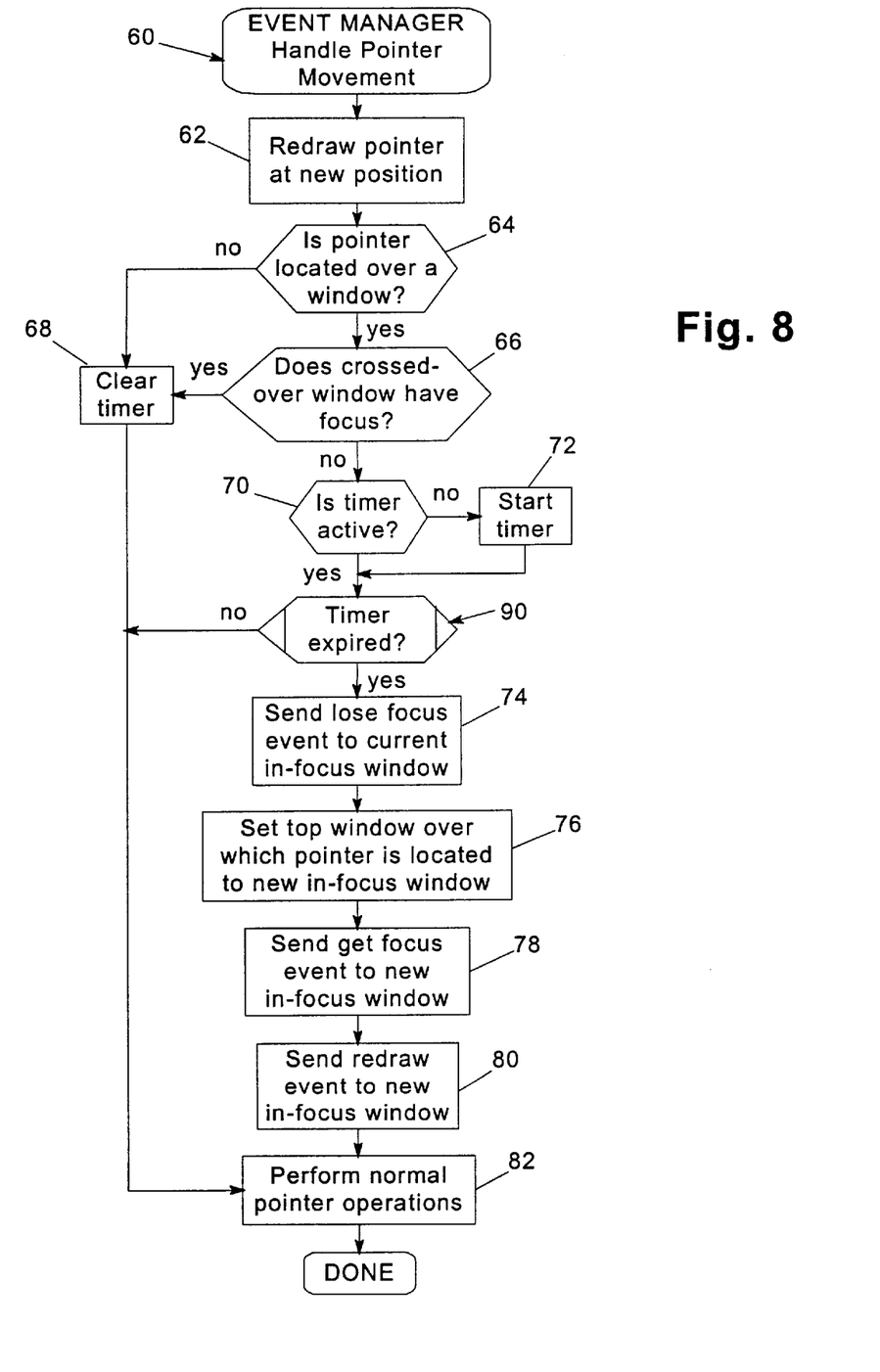
FIG. 8 is a flowchart illustrating the program flow of the handle pointer movement routine of FIG. 7.

FIG. 8 illustrates handle pointer movement routine 60 in greater detail. Routine 60 is called responsive to movement of the pointer to a new position on the computer display, with the position provided to routine 60 via data associated with the event, as is well known in the art. The routine basically controls a switch timer that is started when the pointer moves into the display region of a background window. If the pointer is ever moved from the display region of the background window, e.g., off of the window or back into the display region of the current in-focus window, the timer is cleared. However, if the pointer remains within the display region of the background window for the amount of time determined by a switch delay variable, the timer expires and an in-focus window switch occurs.

Routine 60 begins in block 62 by redrawing the pointer at the new position specified in the event, a process which is also known in the art. Next, block 64 determines whether the pointer is located over a window—that is, whether the current location of the pointer has "crossed-over" the display region of any window. If not, control passes to block 68, where the switch timer is cleared. Control then passes to block 82 to perform normal pointer operations (known in the art), prior to completion of routine 60.

Returning to block 64, if the pointer is located over a window, control passes to block 66 to determine whether the crossed-over window currently has focus. If so, no in-focus window switch need occur, so control passes to blocks 68 and 82 to clear the switch timer and perform normal pointer operations, prior to completion of routine 60. If, however, the crossed-over window does not have focus, control passes to block 70. It should be appreciated that blocks 64 and 66 may determine the window crossed-over by the pointer in a number of manners. For example, the location of the pointer may be compared to the display region defined for each window, starting with the window in the top layer of the display and proceeding down successive layers until all windows have been processed.

Block 70 determines whether the switch timer is currently active. The switch timer may be, for example, a separate free-running timer object implemented in the computer system, and which may be started, stopped and/or cleared by invoking suitable methods for the object.

If the switch timer is not active (e.g., if it has been previously cleared), control is passed to block 72 to start the timer, and then a timer expired routine 90 is executed to determine whether the timer has expired. If the switch timer is already active, block 70 passes control directly to routine 90.

If the timer has not expired, routine 90 passes control to block 82 to handle normal pointer operations and terminate routine 60. If the timer has expired, however, an in-focus switch operation is initiated by passing control to block 74 to send a "lose focus" event to the current in-focus window, such that the current in-focus window is demoted to the background. Next, block 76 sets the top window over which the pointer is located to be the new in-focus window. Determination of this window may be performed in basically the same manner as the crossed-over window is determined above in connection with blocks 64 and 66.

Next, block 78 sends a "get focus" event to the new in-focus window to promote the window to the foreground. Next, if not performed as a component of the "get focus" event, block 80 is executed to send a "redraw" event to the new in-focus window such that the new arrangement of windows is updated on the computer display. Control then passes to block 82 to perform any necessary normal pointer operations, whereby routine 60 is then complete.

It should be appreciated that the handling of "lose focus", "get focus" and "redraw" events by a window is well known in the art. Consequently, no further discussion of the handling of these events is provided herein.

Figure 9:
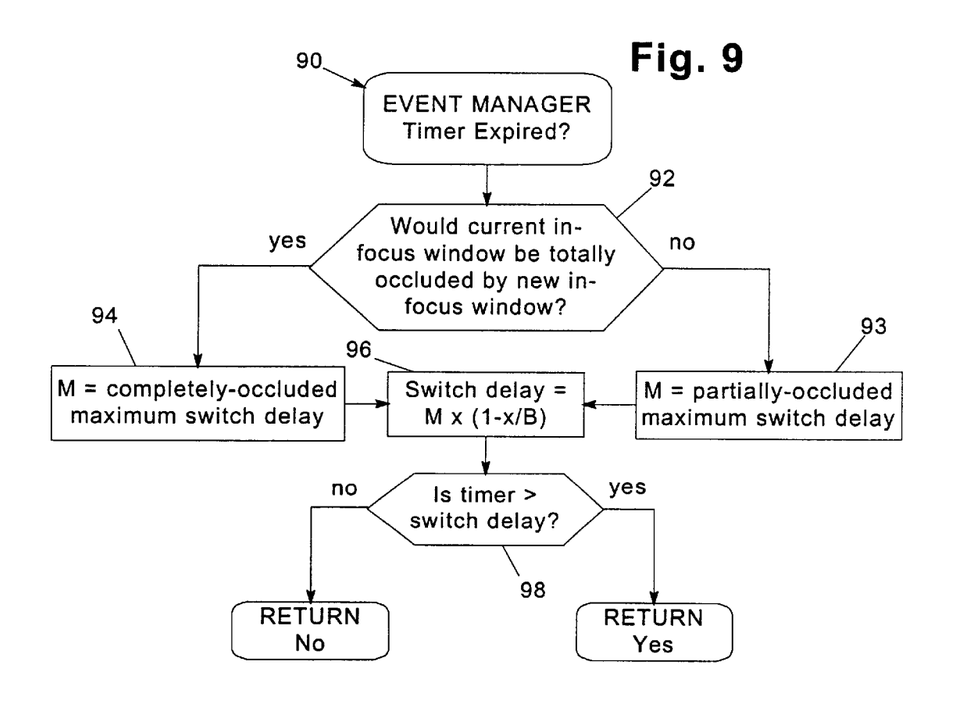
FIG. 9 is a flowchart illustrating the program flow of the timer expired routine of FIG. 8.

One suitable implementation of timer expired routine 90 is illustrated in greater detail in FIG. 9. Routine 90 begins in block 92 by determining whether the current in-focus window would be completely occluded by the new in-focus window, e.g., by comparing the display regions thereof. Depending upon the results of this inquiry, one of blocks 93, 94 is executed to set a variable M to equal either a partially-occluded maximum switch delay value (block 93) or a completely-occluded maximum switch delay (block 94).

As discussed above, it may be desirable to treat completely-occluded windows separately so that a greater amount of time is provided for a user to cancel the in-focus window switch operation in such instances. As a result, the completely-occluded maximum switch delay is typically greater than the partially-occluded maximum switch delay. In the alternative, a single value may be used for either instance, whereby blocks 92, 93 and 94 may be omitted.

Upon completion of either block 93, 94, control passes to block 96 to calculate a switch delay value based upon the distance x from the display boundary of the current in-focus window relative to the distance B from the display boundary to a switch boundary defined for the window (e.g., using equation (1) discussed above). Next, block 98 determines whether the current timer value exceeds the switch delay. If so, a "yes" value is returned to routine 60, indicating that the timer has expired. If not, a "no" value is returned to routine 60, indicating that the timer has not yet expired. Routine 90 is then complete.

It should be appreciated that in the configuration described above, detection of the expiration of the timer will typically not occur without receipt of a pointer movement event. However, in some implementations, it may be desirable to detect expiration of the timer prior to receipt of a pointer movement so that, for example, if a user moves the pointer over a window that does not currently have focus and allows the pointer to remain in a fixed location until the timer expires, the switch will occur prior to further movement of the pointer. This may be performed, for example, by utilizing a separate timer object that either issues the appropriate events to perform the switch automatically upon timer expiration (e.g., as described above with respect to blocks 74–80 of FIG. 8), or that issues a pointer movement event that is detected and processed in the manner described above for routine 60 of FIG. 8.

It should also be appreciated that any of the above variations for setting the switch delay may be used in the alternative. Moreover, various additional modifications may be made to the above-described embodiments without departing from the spirit and scope of the invention. For example, in-focus switching operations may be performed for user interface components other than windows. Moreover, rather than promoting a new user interface component to the top layer, the user interface component may simply be promoted to a higher, yet intermediate layer.

Other modifications will be apparent to one of ordinary skill in the art. Therefore, the invention lies in the claims hereinafter appended.

What is claimed is:

1. A method of displaying a plurality of user interface components on a computer system, the method comprising:

(a) displaying on a computer display a plurality of user interface components disposed in a plurality of layers, each user interface component including a display region defined by a display boundary thereof;

(b) orienting a first user interface component from the plurality of user interface components in a top layer of the plurality of overlapping layers when a user-actuated pointer is disposed within the display region of the first user interface component, including displaying the first user interface component as appearing to overlap a second user interface component from the plurality of user interface components; and (c) in response to user input to move the pointer from the display region of the first user interface component to the display region of the second user interface component, promoting the second user interface component to a higher layer than the first user interface component so long as no user input to move the pointer back to the display region of the first user interface component is received within a predetermined period of time, said predetermined period of time being a calculated switch delay value, said switch delay value being calculated by
  (i) determining a distance from a current location of the pointer to the display boundary of the first user interface component; and
  (ii) calculating the switch delay value as a function of the distance from the current location of the pointer to the display boundary of the first user interface component.

2. The method of claim 1, wherein calculating the switch delay value as a function of the distance from the current location of the pointer to the display boundary of the first user interface component uses the equation:

$$\text{Switch delay value} = M \times (1 - x/B)$$

where M is a maximum switch delay value, B is a distance from the display boundary of the first user interface component to a switch boundary thereof, and x is a distance from the current location of the pointer to the display boundary of the first user interface component.

3. A computer system, comprising:

(a) a computer display; and (b) a processor, coupled to the computer display, the processor configured to (1) display on the computer display a plurality of user interface components disposed in a plurality of layers, each user interface component including a display region defined by a display boundary thereof; (2) to orient a first user interface component from the plurality of user interface components in a top layer of the plurality of overlapping layers when a user-actuated pointer is disposed within the display region of the first user interface component; (3) to display the first user interface component as appearing to overlap a second user interface component from the plurality of user interface components; and, (4) in response to user input to move the pointer from the display region of the first user interface component to the display region of the second user interface component, to promote the second user interface component to a higher layer than the first user interface component so long as no user input to move the pointer back to the display region of the first user interface component is received within a predetermined period of time, said predetermined period of time being a calculated switch delay value, said switch delay value being calculated by determining a distance from a current location of the pointer to the display boundary of the first user interface component and by calculating the switch delay value as a function of the distance from the current location of the pointer to the display boundary of the first user interface component.

* * * * *